United States Patent Office 2,861,032
Patented Nov. 18, 1958

2,861,032

PREPARATION OF 1,1-DIFLUORO-1-CHLOROETHANE

Otto Scherer and Johann Queck, Frankfurt am Main, Germany, assignors to Farbwerke Hoechst Aktiengesellschaft vormals Meister Lucius & Brüning, Frankfurt, Germany, a corporation of Germany No Drawing. Application February 17, 1956
Serial No. 566,090

3 Claims. (Cl. 204—163)

This invention relates to the preparation of 1,1-difluoro-1-chloroethane.

It is known that in the chlorination of 1,1-difluoroethane at about 80° C. to about 120° C. in the gaseous phase, while exposed to light, a yield of a little more than 70 percent of 1,1-difluoro-1-chloroethane is obtained under the most favorable conditions. In this case, a little more than 20 percent of the starting material remain unchanged and about 5 percent of the starting material are converted to higher chlorinated products. It has also been proposed to react 1,1-difluoroethane with chlorine in the gaseous phase at temperatures ranging from room temperature up to 300° C. while exposed to light, to obtain 1,1-difluoro-1-chlorethane which is then further chlorinated at temperatures above 300° C. In the first stage of this process 1,1-di-fluor-1-chlorethane is obtained in a total yield of about 60 percent and about 15 to about 20 percent of the reacted product are converted to form higher chlorinated products. In this reaction the yield amounts to about 70 percent. Hence this process as compared with that which has been referred to above involves the further disadvantage to bring about a greater formation of by-products and to produce a still smaller yield.

The compound 1,1-difluoro-1-chloroethane can be used as a refrigerant but is of particular value as an intermediate. Thus, this compound can be dehydrochlorinated, usually by pyrolysis, to produce vinylidene fluoride. Vinylidene fluoride can be polymerized and copolymerized, for example, with trifluorochloro-ethylene to produce a variety of valuable polymers.

It is an object of this invention to provide a process for preparing 1,1-difluoro-1-chloroethane.

It is another object of this invention to provide a highly selective process for the production of 1,1-difluoro-1-chloroethane in high yield and purity.

Various other objects and advantages of the present invention will become apparent to those skilled in the art on reading the accompanying description and disclosure.

It has now been discovered that the chlorination of 1,1-difluoroethane with exposure to light (e. g., to ultraviolet light) can be effected in the liquid phase. In this instance there are practically no interfering side reactions. Favorable factors in this connection are the lower reaction temperatures which can be achieved, and the dilution effect due to the components of the reaction. The manner in which the liquid phase is obtained is without significance here. If it is obtained by cooling below the boiling point of the 1,1-difluoroethane (−24° C.), the no pressure is required for the operation. If chlorination under pressure is employed, then chlorination can be performed at correspondingly higher temperatures but below the critical temperature. Finally, one can proceed with chlorination in a suitable solvent which forms the liquid phase, whereby pressure and temperature can be varied over a wide range. In each of these cases, the chlorination can be carried out in a continuous manner. If chlorination is carried out under these conditions according to the invention, the reaction velocity diminishes very much as soon as the amount of chlorine calculated for the formation of 1,1-difluoro-1-chloroethane is consumed, and one obtains about 90% yield of the purest 1,1-difluoro-1-chloroethane of a boiling point −23 to −23.7° C.

As compared with the known process which is carried out in the gaseous phase, the process of operating in the liquid phase according to this invention involves the advantage to produce a considerably greater yield associated with a considerably smaller quantity of higher chlorinated products. Apart from that and as compared with the chlorination in the gaseous phase, the chlorination in the liquid phase offers the further advantage to bring about a greater yield per unit of volume and time. Furthermore, according to this invention the separation of the hydrogen chloride can be effected in a much simpler manner than in the known processes, since in the process of this invention the hydrogen chloride escapes in gaseous form and can be separated to a great extent by distillation. In contradistinction thereto, in the known process operating in the gaseous phase the hydrogen chloride is washed with water and thereby lost.

Although it is known to carry out the photochemical chlorination of normal and gaseous halogenated hydrocarbons other than 1,1-difluoroethane in the liquid phase, it could, however, not be expected that 1.1-difluoroethane could be chlorinated in the liquid phase to form almost exclusively 1,1-difluoro-1-chloroethane, this the more so since it is known that in the chlorination of the analogous 1,1-dichloroethane in the liquid phase a mixture of 1,1,1- and 1,1,2-trichloroethane is formed, whereas in the gaseous phase practically only 1,1,1-trichloroethane is obtained. Therefore, it should have been expected that in the chlorination of 1,1-difluoroethane in the liquid phase, i. e. at a temperature lower than that applied in the known processes, a mixture of 1,1-difluoro-2-chloroethane and 1,1-difluoro-1-chloroethane would be obtained.

The following examples are presented in order to illustrate the process of this invention. The term "yield" is defined as the percent by weight of ethylidene fluoride input which is recovered as 1,1,1-difluorochloroethane.

Example 1

1660 grams of 1,1-difluoroethane are condensed in a chlorination vessel equipped with an irradiation lamp, using reflux condensation with Dry Ice/butanol. Chlorine is introduced with exposure to light while the hydrogen chloride escapes overhead. After an absorption of 1790 grams of chlorine the chlorination comes to a stop for all practical purposes. The product is washed, dried, and fractionally distilled. We obtain: 145 grams of 1,1-difluoroethane, 2200 grams 1,1-difluoro-1-chloroethane which, after deduction of the starting product, corresponds to an 87.5% yield, and 175 grams of over-chlorinated higher-boiling portions. If the chlorine and the 1,1-difluoroethane are introduced at the bottom of the vessel in a ratio of 1:1, then the 1,1-difluoro-1-chloroethane can be continuously withdrawn by means of an overflow pipe.

Example 2

2.5 kilograms of 1,1-difluoroethane are condensed in a lead-lined pressure vessel equipped with a reflux condenser and an irradiation lamp. The temperature is maintained at zero to 10° C. by means of brine cooling. On the basis of decoloration, and with simultaneous ultraviolet radiation, chlorine is forced in under pressure. After an absorption of 2.7 kilograms of chlorine, the chlorination is concluded for all practical purposes. The pressure increases to 18 atmospheres at −5° C. The gas mixture is washed, dried and distilled. We obtain: 3.28 kilograms of 1,1-difluoro-1-chloroethane, also 217 grams of starting material and 260 grams of over-chlorinated portions. The yield, after deduction of the starting material, is 87%. If, after termination of the above operation, additional quantities of chlorine and 1,1-difluoroethane in the ratio of 1:1 are introduced under pressure into the 1,1-difluoro-1-chloroethane formed, and if the reaction product is removed from the liquid phase by means of a valve while the hydrogen chloride is removed separately from the gas phase with pressure release, the process will be continuous.

Example 3

Two liters of carbon tetrachloride are charged into a chlorination vessel equipped with a water cooling coil and an irradiation lamp. 1,1-difluoroethane and chlorine in a molar ratio of 1:1 are introduced separately, with exposure to light and cooling to 10° C. In this manner, 850 grams of 1,1-difluoroethane and 912 grams of chlorine are introduced within eight hours. The escaping reaction gases, and the carbon tetrachloride, entrained due to vapor pressure, are washed with water, dried over calcium chloride, and distilled. We obtain: 110 grams of starting material and 1045 grams of 1,1-difluoro-1-chloroethane, corresponding to a yield of 81%. The residue consists of the entrained carbon tetrachloride and of the over-chlorinated portions.

Various modifications and alterations of the process of this invention will be apparent to those skilled in the art and may be used without departing from the scope of this invention.

Having thus described the invention, we claim:

1. A process for the manufacture of 1,1-difluoro-1-chloroethane which comprises reacting 1,1-difluoroethane in the liquid phase with chlorine at a temperature below about −24° C. and at atmospheric pressure in the presence of light.

2. A process for the manufacture of 1,1-difluoro-1-chloroethane which comprises reacting 1,1-difluoroethane in the liquid phase with chlorine in the presence of light at a temperature not higher than 10° C.

3. The process of claim 2 in which the reaction is effected in the presence of carbon tetrachloride as an inert solvent.

References Cited in the file of this patent

UNITED STATES PATENTS

| | | |
|---|---|---|
| 2,412,389 | Cass | Dec. 10, 1946 |
| 2,499,129 | Calfee et al. | Feb. 28, 1950 |